(No Model.)
M. WEINRICH.
REVIVIFYING BONE BLACK.
No. 586,278. Patented July 13, 1897.
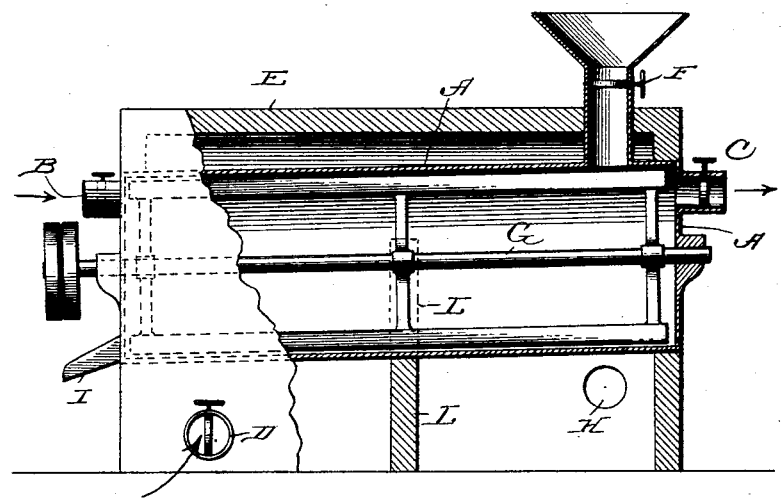
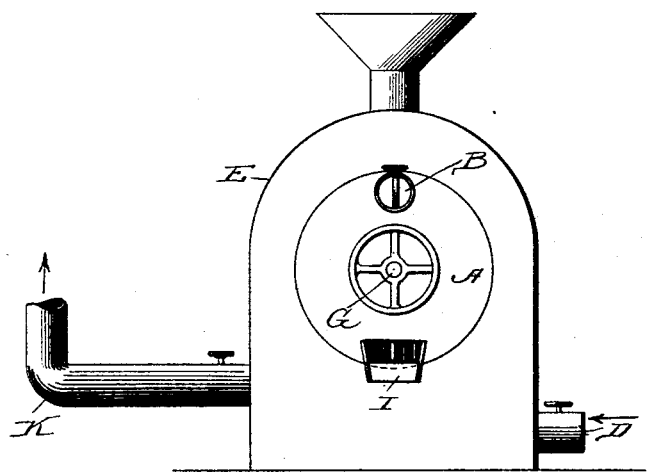
WITNESSES:
Moriz Weinrich INVENTOR
BY
John J. Halsted & Son
his ATTORNEYS

UNITED STATES PATENT OFFICE.

MORIZ WEINRICH, OF ST. LOUIS, MISSOURI.

REVIVIFYING BONE-BLACK.

SPECIFICATION forming part of Letters Patent No. 586,278, dated July 13, 1897.

Application filed April 10, 1896. Serial No. 587,024. (No specimens.)

*To all whom it may concern:*

Be it known that I, MORIZ WEINRICH, a resident of St. Louis, in the State of Missouri, have invented a certain new and useful process for removing carbon and other organic matters, and also certain inorganic matters, from bone-black through oxidation; and I do hereby declare that the following is a full, clear, and exact description of the invention, which will enable others skilled in the art to which it appertains to make and use the same, reference being had to the accompanying drawing, and to letters of reference marked thereon, which forms a part of this specification.

In my United States Patent No. 530,632, dated December 11, 1894, I describe an apparatus for decarbonizing and for revivifying bone-black without charring the same.

I will now set forth a process by which carbon or other organic matter, and also certain inorganic matters, can be removed from bone-black through oxidation, either by means of this apparatus or by any other suitable vessel or drum having means for controllable admission and controllable discharge of atmospheric air, for receiving and for discharging the material, and some means for admitting the required heat to such vessel or drum.

In the drawing I have shown a simple means for practicing my invention, A indicating a drum or vessel adapted for treating the bone-black; B, a means for regulating the admission of air; C, a means for controlling its discharge; D, a means for admitting and regulating the heat for heating the vessel; E, a casing around the vessel; F, a means for regulating the feed of the bone-black; G, a revolving shaft with paddles; H, a means for discharging the heating-gases; I, a discharging-mouth, and K a pipe to any draft or suction fan.

The object of my process is to free bone-black, through oxidation, from organic matters, and also from certain inorganic matters, such as iron and sulfids, absorbed by the bone-black during the filtration of sugar solutions or other solutions or liquids, or from any excess of carbon and of iron and sulfids accumulated through continuous revivifying in kilns.

As known to those versed in the art, the present mode of revivifying bone-black consists in converting the organic matters absorbed during the filtration by destructive distillation into carbon in retorts at a red heat under careful exclusion of air. This carbon accumulates gradually and chokes the pores of the bone-black, thus impairing more and more its efficiency until its use has to be discontinued. Certain inorganic matters, especially iron and sulfid of calcium, which are very injurious to sugar solutions, accumulate likewise by this way of revivifying, and sometimes to such a degree that the bone-black is no more fit for use in sugar refineries and has to be discarded for this reason alone. My process avoids these serious disadvantages, besides being cheaper in its operation than the ordinary kilnwork. It is carried out in the following way: The bone-black to be revivified, coming from the filters, is deprived first, through drying, of more or less of its moisture. It then enters through some controllable feeding device into a suitable apparatus, as mentioned above. I generally prefer the use of a revolving drum provided inside with projecting ribs, which move the bone-black slowly to the discharge end, as shown in my United States Patent No. 530,632. The apparatus may be constructed, however, in different ways—for instance, as shown in the drawing, in a stationary drum or vessel having a slight incline toward its discharge end and provided with a shaft extending through its whole length, to which shaft paddles are fastened, which when set in motion will lift and drop the bone-black, continuously moving it from the upper end to the discharge end. The vessel or drum is surrounded by a brick wall. Between the wall and vessel a space is left of about six inches width. In this space hot gases coming from a furnace or other outside source of heat are admitted, the object being to heat the vessel from its outer side, and thereby also the bone-black which is inside of it, to the desired temperature. The gases enter into this space at the discharge end of the drum, surround and heat it continuously in its whole length, and are drawn off either by a chimney or a fan at its feed end.

Both ends of the vessel are provided with suitable devices in the shape of sliding shutters or dampers, their object being to admit atmospheric air at the discharge end and to discharge it at the feed end, thus procuring a continuous and easily-controllable draft of air through the vessel.

As soon as the apparatus is heated to the desired degree the bone-black enters in a regulated stream into its upper end, is heated there at once, and lifted and dropped continuously by the ribs or paddles or other suitable means arranged in the vessel. Any moisture retained by the bone-black will evaporate quickly and will escape with the draft of air. At the same time the bone-black is slowly moved to the discharge end of the vessel and every particle of it is exposed in a heated state repeatedly to the air which passes through the apparatus. The oxygen of the air is thereby enabled to enter into the very finest pores of every grain. It will in this way oxidize gradually the organic matters and the iron and sulfids taken up during its last use, and which are deposited as a thin coat on top of the carbon, which itself covers the mineral framework of the bone-black.

I have found that if sufficient air is admitted most of the organic matters will oxidize at a temperature of between 250° and 300° Fahrenheit, and that the rest can be removed at a temperature of about 400° Fahrenheit, and to which degree the bone-black has to be exposed only for a few minutes at the discharge end of the apparatus, where it is the hottest, because the heated gases enter beneath the vessel or drum at this end.

By a proper regulation of the temperature, of the draft of air, and of the feed of the bone-black, and of the velocity at which it is moved by the revolving ribs or paddles or other means through the vessel the organic matters, the iron, and sulfids can be oxidized without removing any of the carbon which is lying underneath these constituents. I have found that it requires a temperature of over 400° Fahrenheit before any of this carbon will oxidize, so that by a proper use of the described means a line can be easily drawn where the revivification is completed before any of the underlying carbon is removed. The bone-black revivified in this way falls at the discharge end into a suitable cooling device and after being cooled is again ready for use.

I will enumerate, briefly, the great advantages of this new way of revivifying bone-black over the old system.

First. The bone-black is kept always at its best and no granular char has ever to be discarded. The pores always remain open and no shrinking of the mineral framework will take place because of the mild heat applied during the revivification.

Second. The revivifying is done in about twenty minutes and will require only about fifty per cent. of the fuel needed now with the ordinary kilnwork.

Third. The usual washing of the bone-black with boiling water in the filters after its use may be discontinued as soon as the salts are washed out, as it is time-saving and cheaper to oxidize the remaining organic matter than to wash it out.

Fourth. The invaluable carbonate of lime contained in the bone-black, which is generally too much reduced by excessive washing with boiling water, will be kept, by less washing, nearer to its original percentage.

Fifth. By the regular and often-repeated exposure of all the particles of the bone-black in a heated state to the air the percentage of iron and sulfids will be kept at low figures through oxidation.

I mentioned above that by the present existing system of revivifying bone-black the percentage of carbon and also of iron and sulfids accumulates gradually and renders it thereby more and more unfit for filtration purposes. Users of bone-black who retain this system are enabled by adopting my process as an auxiliary to remove as often as desired this accumulated excess of carbon, of iron, and of sulfids, and can do this without any extra expense. In this case the bone-black coming from the filters is treated in substantially the same way as hereinbefore described; but as, besides the organic matters, iron and sulfids and also a certain amount of carbon have to be removed the means and devices for attaining this object must be regulated accordingly.

The amount of bone-black fed into the apparatus has to be diminished, while the temperature and the draft of air have to be increased, and in doing this properly the desired amount of carbon can be burned off to a nicety in a very uniform way, thus restoring the bone-black to its original porosity and efficiency.

This combined treatment of revivifying and decarbonizing bone-black will not require any more fuel and attendance than by simply revivifying it in kilns. It is advisable to repeat this operation as often as the carbon has increased about (two) 2 per cent. over its original percentage. If the amount of carbon to be removed does not exceed (five) 5 per cent. of the weight of the bone-black, it can be done in one operation at a maximum temperature of about 500° Fahrenheit and by admitting plenty of air into the apparatus. If old bone-black containing an excess of over (five) 5 per cent. of carbon shall be reduced to its original percentage of carbon, the temperature may be raised to such a degree that the bone-black is brought at the discharge end to a dull red heat, admitting at the same time sufficient air to insure the desired degree of oxidation. The same object can be attained by treating the bone-black twice or three times at a lower temperature than red heat, removing by each operation two to three per cent. of carbon.

If the bone-black which shall become decarbonized has been before deprived of its organic foreign matters by burning it in the ordinary kilns, then the treatment is substantially the same as described above. In this case a somewhat larger quantity can be run through the apparatus in a given time than when the organic foreign matters and some moisture have to be removed in the same operation.

The bridge-wall L serves not only to support the non-revolving cylinder at its center, but it also forces the gases to surround the vessel or drum properly.

I claim—

1. The described process of revivifying bone-black consisting in removing from it through oxidation all the organic impurities and certain inorganic impurities, and also any excess of carbon, by exposing the bone-black in a heated state and while being moved or agitated in some suitable device, to a regulated and continuous draft of atmospheric air, and to a regulated temperature, and under a regulated and continuous feed of the bone-black.

2. The described process of revivifying bone-black through oxidation, consisting in exposing the bone-black in a heated state to a regulated and continuous draft of atmospheric air, and to a regulated temperature, and under a regulated and continuous feed of the bone-black, and whereby the bone-black is deprived of all its organic impurities and certain inorganic impurities taken up during its prior use; or of all the organic impurities and certain inorganic impurities taken up during its use simultaneously with any excess of carbon; or of any excess of carbon and also certain inorganic matters, as set forth.

MORIZ WEINRICH.

Witnesses:
B. A. LANGE,
G. WM. SENN.